3,047,470
MICROBIOLOGICAL 11α-HYDROXYLATION OF 16α,17α-EPOXY PREGNENES
Louis M. Pruess, Pearl River, N.Y., and Charles Pidacks, Montvale, and Neil E. Rigler, Ridgewood, N.J., assignors to American Cyanamid Company, New York, N.Y., a corporation of Maine
No Drawing. Filed Nov. 30, 1959, Ser. No. 855,973
11 Claims. (Cl. 195—51)

This invention relates to the hydroxylation of steroids. More particularly, it is concerned with a novel method of introducing hydroxyl groups into the 11-position in certain useful steroids of the pregnene series by means of microbiological fermentation. It also deals with the hydroxylated product.

The essential requirement for the 11-oxygen in steroids demonstrating anti-inflammatory activity, such as hydrocortisone and cortisone, is well established. Such compounds are becoming increasingly important, either as therapeutic agents or/as intermediates in the preparation of other therapeutically useful steroids. Such compounds have been found useful, for example, as anti-inflammatory agents in the treatment of arthritis, asthma, burns, bursitis, and the like, and also in the treatment of skin disorders and collagen diseases. As such, these compounds are used in combination with fillers, excipients, etc., in tablets, powders, pills, etc. They can also be used parenterally in a solution or in a suspension.

As indicated above, many of these steroids contain a hydroxyl group in the 11-position. According to the present invention, it has been found that this group can be introduced by fermentation in the presence of suitable fungi. Those fungi which have been found useful for this purpose include, for example: *Botryodiplodia theobromae, Didymocladium ternatum, Myrothecium roridum, Hormodendrum hordei, Hormodendrum pallidum, Fusarium solani* and *Penicillium ehrilichii*. These fungi are more fully discussed below.

Typical steroids which can be usefully processed according to the present invention include, for example:

4-pregnene-21-ol-3,20-dione-16α,17α-epoxide;
4-pregnene-3,20-dione-16α,17α-epoxide; and
5-pregnene-3β-ol-20-one-16α,17α-epoxide.

For simplification, these will be hereinafter referred to as "epoxy DOC," "epoxy progesterone" and "epoxy pregnenolone" respectively. The invention is also applicable to esters of these steroids, such as the acetate and the like.

The reaction which obtained according to the present invention may be shown by the following illustration:

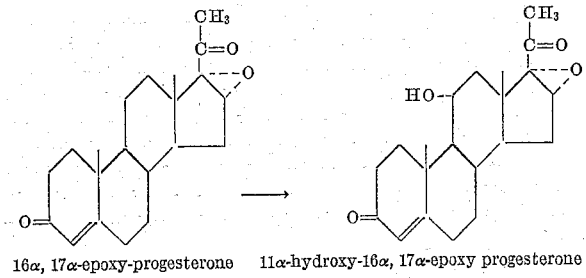

16α,17α-epoxy-progesterone    11α-hydroxy-16α,17α-epoxy progesterone

When the starting material is an ester, such as the acetate, the acyl group also will be hydrolyzed as shown for example by the following illustration:

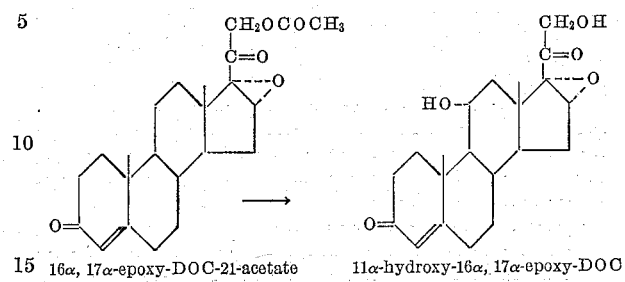

16α,17α-epoxy-DOC-21-acetate    11α-hydroxy-16α,17α-epoxy-DOC

Wheren an ester, such as the 21-acetate and the like, is desired as the final product, it may be readily prepared from the reaction product by known methods. This may be done, for example, by reacting the product with an esterifying agent, such as acetic anhydride, or the like, in a suitable solvent such as pyridine or the like.

In carrying out the process of the present invention, the organism is cultivated aerobically in a suitable nutrient medium with the steroid which is to be hydroxylated. During the growth of the organism under favorable conditions, the desired hydroxyl group is introduced into the steroid ring sructure. The exact mechanism of this hydroxylation is not wholly certain. It is thought to be caused by enzymes produced by the organism in the process of growth.

A suitable nutrient medium contains a soluble source of carbon, nitrogen, and mineral elements. In general, the preparation of such media is well known and the practice of the present invention in this respect may follow such procedures.

In an illustrative preparation of inoculum, spores from a suitable culture on potato dextrose agar or the like are used to inoculate 100 ml. of sterile medium in a 500 ml. Erlenmeyer flask. An illustrative medium of this type contains the following: 1% cornstarch, 1% cornsteep and 2% molasses, the whole being adjusted to about pH 7 with 10-normal sodium hydroxide. This medium is used in the illustrative examples below. Inoculated medium is incubated at about 27° C. on a shaker for about 16 to 24 hours. Such inocula are used to inoculate larger batches of medium in seed bottles. Such bottle cultures, after further incubation, usually under conditions of aeration and stirring are used to inoculate large batches of medium in aerated, stirred fermenter tanks. This procedure is given as a typical illustration only. While it is used in the examples below, it may be varied if necessary or desirable in actual practice. For example, other media, media volumes, incubation periods, and temperatures may be used.

A good typical practice in fermenter tank procedure, one which also is used in the examples below, is illustrated in the following method. Medium is prepared in the tank, sterilized by heating and cooled to the temperature of the inoculant. The medium is then inoculated with from about one to about six percent of a vegetative inoculum prepared as above. The broth is then agitated with a stirrer at from about 100 to about 500 r.p.m., and aerated at the rate of about 0.5 to about 1.5 volumes of air per volume of broth. The actual values used will vary within the approximate ranges shown, depending upon the volume, the shape of the tank, the stirrer and the like.

The inoculated tank or bottle is then maintained at the desired temperature, in the illustrative case about 27° C., until the organism growth reaches about 0.3 g. per 100 ml., or more. The steroid substrate is then added, usually dissolved in methanol. A good practice is to use about 1 gm. of substrate per 60 ml. of methanol and to add a sufficient amount to provide some 0.25 to 0.35 mg./ml. of broth. Agitation and aeration are continued until the substrate disappears. The culture broth is then harvested and the hydroxylated product isolated. Conversions of some 10 to about 25 percent of the added substrates are readily produced.

The amount of steroid added as substrate to the fermentation may be varied as necessary or desirable. However, a good practice will ordinarily be to add on the order of about 0.05 to about 1.0 gram per liter of nutrient medium.

When using such steroid substrates in the fermentation, the products formed are the free steroids. The steroid substrates are generally added to the fermentation in solution or in finely-divided form. A preferred method is to dissolve the steroid in methanol or some other water-miscible solvent and to add it to the fermentation medium at the desired stage in the process. Although the steroid may precipitate from solution when so added, it is dispersed throughout the medium as a fine suspension and becomes readily available to the organism for oxidation.

During fermentation, it is frequently found desirable to add an antifoaming agent. In such cases, commercially-available products may be used. These usually contain such agents as silicones, glyceride oils, and the like. These compounds are added from time to time and in the amounts needed. Their use is not necessarily a feature of the invention.

The present invention will be more fully described in conjunction with the following examples. They are intended as illustrations.

EXAMPLES 1 AND 2

To illustrate the invention, inoculum and medium were prepared as hereinbefore discussed. Sterile medium in five gallon bottles was then inoculated, the culture grown, and the substrate added as shown in the following Table I. In Example 1, the fermenting organism was *Didymocladium ternatum;* in Example 2, *Botryodiplodia theobromae.* In both, the substrate added was three grams of 16α,17α-epoxy progesterone. The percent conversion data are expressed in weight percent based on the weight of substrate added.

TABLE I

| Example No. | 1 | 2 |
|---|---|---|
| Agitator Speed | 400 r.p.m | 400 r.p.m. |
| Air flow rate (A) | 0.6 | 0.5. |
| Volume of Medium (liters) | 12 | 12. |
| Sterilization time | 1 hr. at 120° C. | 1 hr. at 120° C. |
| Inoculum | 1.6% | 1.3%. |
| Prefermentation time | 27 hrs | 29 hrs. |
| Conversion time | 49 hr | 26 hrs. |
| Initial pH | 7.3 | 7.0. |
| Final pH | 6.1 | 6.6. |
| Conversion | 10% | 21.2%. |

(A) = volume of air per volume of medium per minute.

EXAMPLES 3 AND 4

To illustrate the practice on a larger scale, Examples 1 and 2 were repeated except that 50-gallon tanks were used and the added substrate was 16α,17α-epoxy DOC-21-acetate. In both examples, the fermentation organism was *Myrothecium roridum.* Details are shown in Table II.

TABLE II

| Example No. | 3 | 4 |
|---|---|---|
| Agitator Speed | 120 r.p.m | 120 r.p.m. |
| Air Flow Rate (A) | 1.0 | 1.40. |
| Volume of Medium (liters) | 100 l | 100 l. |
| Sterilization time | 40 min. at 124° C. | 35 min. at 120° C. |
| Inoculum | 6% | 6%. |
| Prefermentation time | 21 hrs | 20 hrs. |
| Conversion time | 6 hrs | 11 hrs. |
| Initial pH | 7.0 | 6.5. |
| Final pH | 4.5 | 3.6. |
| Conversion | 23.2% | 21.4%. |

(A) = volume of air per volume of medium per minute.

EXAMPLE 5

*Isolation of 11α-Hydroxy-16α,17α-Epoxy-DOC*

About one hundred liters of whole mash from culture Example 3 is filtered and the cake is washed with two 5 liter volumes of water. The combined filtrate and washings are extracted with three 28 liter portions of chloroform. The combined extracts (65 liters) are concentrated to about one liter, washed with three 250 ml. portions of 2% aqueous sodium bicarbonate, the sodium bicarbonate extracts being back extracted with 200 ml. of chloroform which is added to the main portion, and the latter is then washed twice with 250 ml. of water. The resultant chloroform solution is dried with 100 g. of sodium sulfate and filtered, the sodium sulfate being washed with two 100 ml. portions of chloroform and the washings returned to the main portion. The latter is then treated with 8 g. of activated carbon with stirring for about 15 minutes. The carbon is filtered off, washed with two 50 ml. portions of chloroform and the washings are added to the main portion.

The latter is concentrated under reduced pressure to about 50 ml. at which point 100 ml. ethyl acetate is gradually added, and the mixture concentrated to about 40 ml. and stored in the cold room overnight. The resultant crystals are filtered off, washed with five 10 ml. portions of ethyl acetate, slurrying the crystals with solvent and sucking very dry after each addition to remove yellow pigmented materials. The resultant crystals after drying weighed 4.24 grams.

Two grams of these crystals were chromatographed on a partition column prepared from 500 g. of diatomaceous earth moistened with the lower phase of a system composed of water—1 part; dioxane—5 parts; cyclohexane—4 parts (by volume). The column was developed with the upper phase and the peak at 2.8 column retention volume was collected and the solvent recovered. The residue was crystallized from ethyl acetate and recrystallized from methanol-ethyl acetate. The resultant crystals are of 11α,21-dihydroxy-16α,17α-epoxy-4-pregnene-3,20-dione.

EXAMPLE 6

*Isolation of 11α-Hydroxy-16α,17α-Epoxy-Progesterone*

About 11 liters of whole mash, as produced in Example 1, is adjusted to about pH 5 and one kg. of diatomaceous earth is slurried therewith and stirred for 20 minutes, the slurry is filtered and the filtrate is extracted twice with 11 liters of ethyl acetate, the two extracts being pooled (volume about 21 liters). The pooled extract is washed with 2 liters of a 2% aqueous sodium bicarbonate solution and then concentrated under vacuum to about 1 liter. The crude product that separated is filtered off, yielding 7.5 grams. This is chromatographed on a diatomaceous earth partition column using a solvent mixture composed of 4 parts of petroleum ether, 2 parts of ethyl acetate, 3 parts of methanol and 2 parts of water to yield 273 mg. of substantially pure product. The product melts at 246–247° C. and its infrared and ultraviolet spectra tracings are identical with those of a known sample of 11α-hydroxy-16α,17α-epoxy-progesterone.

EXAMPLE 7

Isolation of 11α-Hydroxy-16α,17α-Epoxy-Progesterone

To about 125 liters of mash produced according to the procedure of Example 1 and adjusted to about pH 5 is added 3 kg. of diatomaceous earth. This mixture is slurried for 20 minutes and filtered, the cake being discarded. The filtrate is extracted twice with ethyl acetate, first with about 125 liters of solvent and second with about 65 liters. The pooled extract, about 140 liters, is washed with 30 liters of 1% aqueous sodium bicarbonate and concentrated under vacuum to about 1.5 liters, at which time 9.5 g. of crude solids separate. Of these solids, 4.2 g. are chromatographed as in the preceding example and 315 mg. of product melting at 244–245° C. is obtained. This product has identical infrared and ultraviolet spectra tracings as those of a known sample of 11α-hydroxy-16α,-17α-epoxy-progesterone.

EXAMPLES 8 AND 9

Preparation of 5-Pregnene-3β,11-Diol-20-One-16α,17α-Epoxide

A sterile aqueous medium containing 2% commercial lactalbumin digest (Edamin), 5% commercial dextrose (Cerelose), 6% by volume corn steep liquor was adjusted to about pH 7 with NaOH and 10 ml. portions were then placed in 100 ml. test tubes. Each tube was then inoculated with 0.2 ml. of a 5 ml. aqueous suspension of spores and mycelium from an agar slant culture of either *Fusarium solani* (Example 8) or *Myrothecium roridum* (Example 9). So-inoculated tubes were placed on a reciprocating shaker at 28° C. for 66 hours. Then two mg. of epoxy pregnenolone dissolved in 0.2 ml. of 70% ethyl alcohol was aseptically added to each test tube culture and the tubes were replaced on the shaker. Some tubes were removed for steroid analysis after further incubation after periods of 24, 48 and 78 hours respectively. After being removed, the content of each culture tube was combined with 40 ml. of methylene dichloride in a 100 ml. bottle and subjected to shaking for 30 minutes at 28° C. Thereafter each so-treated mixture was allowed to separate into solvent and aqueous layers and the solvent layer was collected. Resultant methylene dichloride extracts were placed in a warm water bath and the solvent evaporated therefrom with the aid of an air jet. The resultant dried residues were submitted for paper strip chromatographic analysis. In each case, 5-pregnene-3β,11-diol-20-one-16α,17α-epoxide (11-hydroxy epoxy-pregnenolone) was produced. Treating of several sample paper strips with a phthalic acid paraphenylenediamine test spray produced no colored spots, indicating no oxidation of epoxy-pregnenolone to epoxy-progesterone derivatives occurred.

While the substrates used in the foregoing discussion have previously been produced by other means, it is believed that the 5-pregnene-3β,11α-diol-20-one-16α,17α-epoxide is a new product. It is readily oxidized, via the known Appenauer oxidation with aluminum t-butoxide and acetone, to a product of known utility, i.e., 4-pregnene-11α-hydroxy-4-pregnene-3,20-dione-16α,17α-epoxide according to the reaction shown to the following diagram.

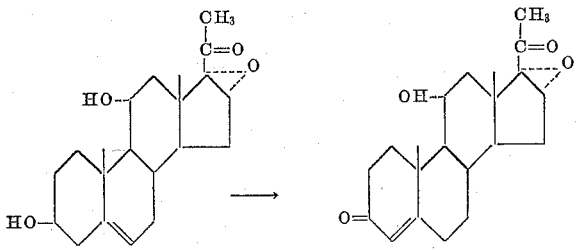

The several fungi disclosed and claimed herein are strains of known species disclosed in the following references:

*Didymocladium ternatum* (Bon.) Sacc. (Saccardo, P. A., Sylloge fungorum omnium hucusque cognitorum, 4: 186–187, 1886.)

*Botryodiplodia theobromae* Patouillard. Gilman, J. C., A Manual of Soil Fungi, p. 201, 2nd edit., Iowa State College Press, Ames, Iowa, 1957.

*Myrothecium roridum* Tode. (Ibid. p. 398.)

*Hormodendrum hordei* Bruhne. (Ibid. p. 330.)

*Hormodendrum pallidum* Oudemans. (Ibid. p. 330.)

*Fusarium solani* (Martius) Appeal and Wollenweber. (Gilman, J. C., A. Manual of Soil Fungi, pp. 372–377, 2nd edit., Iowa State College Press, Ames, Iowa, 1957.)

*Penicillium ehrlichii* Klebahn. (Raper, K. B., and Thom, C. A. Manual of the Penicillia, pp. 146–148. Williams and Wilkins Co., Baltimore, 1949.)

Although, as shown above, these fungi are known, it is believed that their use in the above-described treatment of these particular substrates to produce 11-hydroxylated products according to this invention is new and novel.

We claim:

1. The process of 11-hydroxylating a steroid selected from the group consisting of 4-pregnene-21-ol-3,20-dione-16α,17α-epoxide; 5-pregnene-3β-ol-20-one-16α,17α-epoxide; and 4-pregnene-3,20-dione-16,17α-epoxide, which comprises subjecting said steroid to the fermentative action of a hydroxylating organism selected from the group consisting of *Botryodiplodia theobromae, Didymocladium ternatum, Myrothecium roridum, Hormodendrum hordei* and *Hormodendrum pallidum*.

2. The process which comprises subjecting a steroid to the fermentative action of an organism selected from the group consisting of *Botryodiplodia theobromae, Didymocladium ternatum, Myrothecium roridum, Hormodendrum hordei* and *Hormodendrum pallidum* and recovering therefrom the corresponding 11-hydroxylated steroid.

3. The process which comprises the step of subjecting a steroid selected from the group consisting of 4-pregnene-21-ol-3,20-dione-16α,17α-epoxide; 4-pregnene-3,20-dione-16α,17α-epoxide and 5-pregnene-3β-ol-20-dione - 16α,17α-epoxide to the fermentative action of an organism selected from the group consisting of *Botryodiplodia theobromae, Didymocladium ternatum, Myrothecium roridum, Hormodendrum hordei* and *Hormodendrum pallidum*, and recovering therefrom the corresponding 11-hydroxylated steroid.

4. A process for the production of an 11-hydroxy steroid which comprises: contacting in an aqueous medium under submerged fermentation conditions, the corresponding non-11-hydroxylated steroid to the hydroxylating action of an organism selected from the group consisting of *Botryodiplodia theobromae, Didymocladium ternatum, Myrothecium roridum, Hormodendrum hordei* and *Hormodendrum pallidum*.

5. A process according to claim 4 in which the steroid of the pregnene series to be hydroxylated is selected from the group consisting of 4-pregnene-21-ol-3,20-dione-16α,17α-epoxide; 4-pregnene-3,20-dione-16α,17α-epoxide; and 5-pregnene-3β-ol-20-dione-16α,17α-epoxide.

6. A process which comprises: inoculating a nutrient medium containing assimilable carbon, nitrogen, and mineral salts with a hydroxylating agent selected from the group consisting of *Botryodiplodia theobromae, Didymocladium ternatum, Myrothecium roridum, Hormodendrum hordei* and *Hormodendrum pallidum;* adding thereto a steroid, continuing the resultant fermentative action on the steroid until a substantial amount of corresponding 11-hydroxylated steroid of the 4-pregnene series has been produced, and recovering said product therefrom.

7. A process according to claim 6 in which the steroid to be hydroxylated is selected from the group consisting of 4-pregnene-21-ol-3,20-dione-16α,17α-epoxide; 4-pregnene-3,20-dione-16α,17α-epoxide; and 5-pregnene-3β-ol-20-dione-16α,17α-epoxide.

8. A process for producing 11α-hydroxy-16α,17α-epoxy progesterone which comprises contacting in an aqueous medium under submerged fermentation conditions 16α,17α-epoxy progesterone and *Didymocladium ternatum* and recovering said products therefrom.

9. A process for the production of 11α-hydroxy-16α,17α-epoxy progesterone which comprises contacting in an aqueous medium under submerged fermentation conditions 16α,17α-epoxy progesterone and *Botryodiplodia theobromae* and recovering said product therefrom.

10. A process for the production of 11α,21-dihydroxy-16α,17α-epoxy-4-pregnene-3,20-dione which comprises contacting in an aqueous medium under submerged fermentation conditions 21-hydroxy-16α,17α-epoxy-4-pregnene-3,20-dione and *Myrothecium roridum* and recovering said product therefrom.

11. A method of preparing 5-pregnene-3β,11-diol-20-one-16α,17α-epoxide which comprises contacting in an aqueous medium under submerged fermentation conditions 5-pregnene-3β-ol-20-one-16α,17α-epoxide and *Myrothecium roridum* and recovering said product therefrom.

References Cited in the file of this patent

UNITED STATES PATENTS

| | | |
|---|---|---|
| 2,649,402 | Murray et al. | Aug. 18, 1953 |
| 2,773,079 | Djerassi et al. | Dec. 4, 1956 |
| 2,782,193 | Djerassi et al. | Feb. 19, 1957 |
| 2,816,108 | Julian et al. | Dec. 10, 1957 |
| 2,844,513 | Wettstein et al. | July 22, 1958 |
| 2,874,172 | Herzog et al. | Feb. 17, 1959 |
| 2,889,255 | Murray et al. | June 2, 1959 |
| 2,950,226 | Mannhardt et al. | Aug. 23, 1960 |

OTHER REFERENCES

Prescott et al.: Industrial Microbiology, 3rd edition, McGraw-Hill Book Co., New York, 1959, pp. 755 to 756.